W. MEREDITH.
VEHICLE SEAT.
APPLICATION FILED MAY 12, 1908.
906,442.
Patented Dec. 8, 1908.
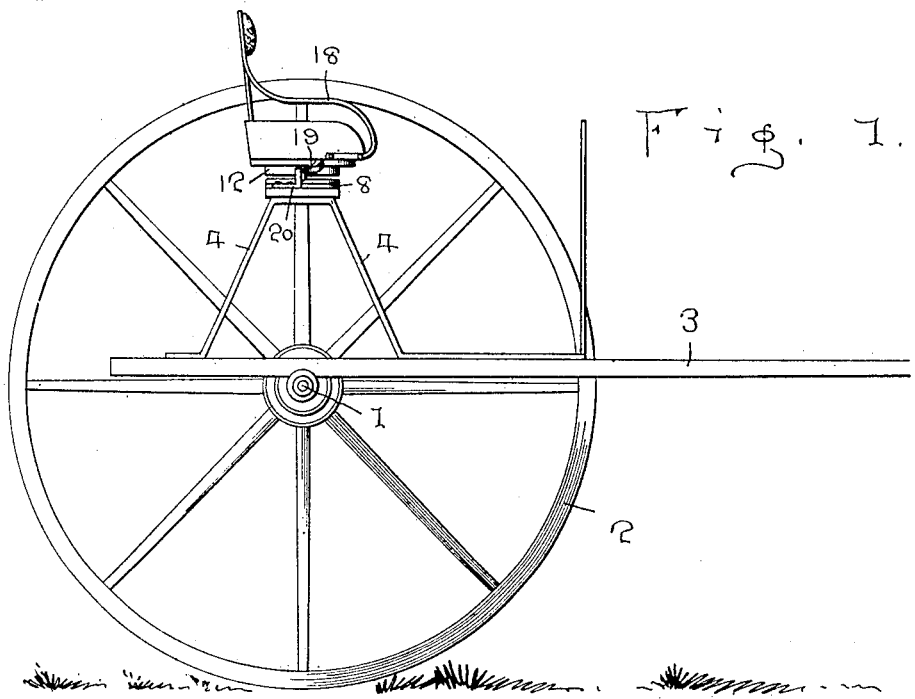
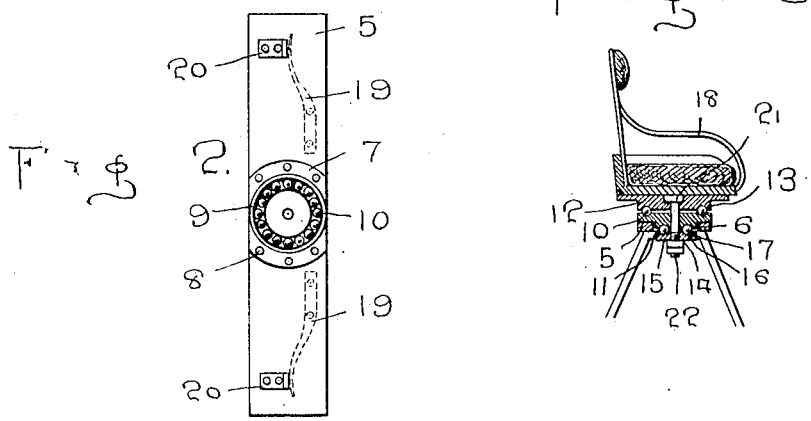
WITNESSES:
INVENTOR
W. Meredith
BY
W. J. FitzGerald
Attorneys

UNITED STATES PATENT OFFICE.

WILLIAM MEREDITH, OF MANCHESTER, TENNESSEE.

VEHICLE-SEAT.

No. 906,442.　　　　Specification of Letters Patent.　　　Patented Dec. 8, 1908.

Application filed May 12, 1908. Serial No. 432,455.

*To all whom it may concern:*

Be it known that I, WILLIAM MEREDITH, a citizen of the United States, residing at Manchester, in the county of Coffee and State of Tennessee, have invented certain new and useful Improvements in Vehicle-Seats; and I do hereby declare the following to be a full, clear, and exact description of the invention, such as will enable others skilled in the art to which it appertains to make and use the same.

This invention relates to new and useful improvements in vehicle seats and has for its object to provide a novel device of this character which will compensate for the lateral or jerking movement of the vehicle.

It is also an object of the invention to provide a novel device of this character which is rotatably supported with relation to the vehicle in order that the occupant of the seat may not be materially affected by the lateral movement of the vehicle incidental to its travel.

It is also an object of the invention to provide a novel device of this character to be applied to two wheeled vehicles, said seat being positioned directly above the supporting axle.

It is also an object of the invention to provide a novel device of this character wherein the seat member proper is rotatably mounted, said rotatable portion being provided with means acting in conjunction with the stationary member to prevent undue rotation thereof.

It is also an object of the invention to provide a novel device of this character which will be simple in construction, efficient and advantageous in practice and comparatively inexpensive to manufacture.

With the above and other objects in view the invention consists in the details of construction and in the novel arrangement and combination of parts to be hereinafter more particularly referred to.

In describing the invention in detail reference will be had to the accompanying drawings forming part of this specification wherein like characters of reference denote corresponding parts in the several views, and in which, Figure 1 is a side view of a vehicle showing the invention applied, one of the supporting wheels being omitted. Fig. 2 is a view in top plan of a stationary section with the spring arms carried by the rotatable section shown in dotted lines. Fig. 3 is a central sectional view through the seat proper showing the means for mounting the rotatable section with relation to the stationary section.

In the drawings 1 indicates the supporting axle of a two wheeled vehicle having mounted thereon a supporting wheel 2, a second supporting wheel being omitted for the purpose of illustrating the invention. Secured to the axle 1 is the frame 3 of the vehicle and to this frame 3 is secured the seat supporting brackets 4. The upper ends of the brackets 4 are connected by the cross-piece or stationary member 5, which is so positioned on the brackets as to be arranged directly above the shaft 1.

Positioned centrally of the member 5 is an opening 6, above which is mounted a block 7 secured to the member 5 by bolts 8, or other securing means. The upper surface of the block 7 is provided with a race-way 9 in which are positioned the ball-bearings 10.
The end surface of the block 7 is provided with a depending portion 11 which projects within the opening 6 of the stationary member 5.

Positioned above the block 7 is a rotatable member 12 having formed in its under surface the annular race-way 13 registering with the race-way 9 of the stationary member 5 when the rotary member is in applied position.

Passing centrally of the rotatable member 12 and depending therefrom is a pivot bolt 14 which also passes centrally of the stationary member 5, and through a cap 15 having in its upper surface, when applied, a race-way 16 registering with the race-way 11, before referred to, and confining within said race-ways the ball-bearings 17. The bolt 14 is arranged vertically with relation to the vehicle and is positioned directly above the axle 1, as it has been found in practice that the invention acts with greater facility when the pivot pin is so positioned, and this location of the pivot pin forms an essential feature of the invention.

Secured in any desired manner to the rotatable member 12 is a seat 18 which may be as preferred, it being only necessary that the rotatable member 12 or the bolt 14 thereof be centrally of the seat.

In two wheeled vehicles it is a well known fact that when the same is being drawn there is constant lateral or swerving movement of the vehicle and this movement creates great inconvenience and hardship to the driver or persons occupying the seat 18, but by the provision of a seat rotatable laterally of the vehicle and having its pivot pin arranged vertically directly above the axle of the vehicle this inconvenience is reduced to a minimum.

In order that the jarring or lateral movement of the vehicle may not cause the seat 18 to swing or move too far around on its pivot 14 the rotary member 12 is provided at a point in advance of its center with the oppositely disposed laterally extending spring arms 19, which are intended to contact with the angular stops 20 secured at proper points on the upper surface of the stationary member 5.

In applying the pivot bolt 14 it has been found best that the head 21 thereof be at the top, and that the lower portion project beyond the cap 15 and be engaged by the nuts 22 or other retaining means.

What I claim is:

1. The combination with a stationary member having an opening therethrough; of a block fixed to the stationary member and having portions thereof entered through said opening, a rotatable member above said block, the meeting faces of the block and rotatable member having race ways therein, a plurality of bearing balls mounted in said race ways, a bolt adapted to pivotally secure the rotatable member above the block, a seat on said block, and spring fingers carried by the seat adapted to normally hold said seat in alinement with the stationary member.

2. In a vehicle seat, the combination with a stationary member and a seat rotatably mounted thereon; of spring arms having one of their ends fixed to the seats and stops on the stationary member adapted to be engaged by the free ends of said spring arms, whereby the tension of said spring will normally hold the seat in alinement with the stationary member.

In testimony whereof I have signed my name to this specification in the presence of two subscribing witnesses.

WILLIAM MEREDITH.

Witnesses:
A. A. WORNACK,
O. M. STEPP.